United States Patent
Shen et al.

(10) Patent No.: US 10,033,973 B1
(45) Date of Patent: Jul. 24, 2018

(54) SYSTEMS AND METHODS FOR CUSTOMIZING A PERSONALIZED USER INTERFACE USING FACE RECOGNITION

(71) Applicant: Honeywell International Inc., Morristown, NJ (US)

(72) Inventors: Jiehong Shen, Shanghai (CN); Xiukuan Yang, Shanghai (CN); Peng Li, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 15/415,053

(22) Filed: Jan. 25, 2017

(51) Int. Cl.
*H04N 7/18* (2006.01)
*G06K 9/00* (2006.01)
*G06F 9/44* (2018.01)

(52) U.S. Cl.
CPC ........... *H04N 7/186* (2013.01); *G06F 9/4443* (2013.01); *G06K 9/00255* (2013.01); *G06K 9/00295* (2013.01)

(58) Field of Classification Search
None
See application file for complete search history.

(56) References Cited

U.S. PATENT DOCUMENTS

| | | | |
|---|---|---|---|
| 5,781,650 A * | 7/1998 | Lobo | G06K 9/00221 382/118 |
| 7,636,456 B2 | 12/2009 | Collins et al. | |
| 9,195,815 B2 | 11/2015 | Choong et al. | |
| 2006/0184800 A1 | 8/2006 | Rosenberg | |
| 2011/0302497 A1* | 12/2011 | Garrett | G06Q 20/10 715/736 |
| 2016/0086020 A1 | 3/2016 | Bigos et al. | |
| 2017/0048497 A1* | 2/2017 | Carter | H04M 11/025 |
| 2017/0123622 A1* | 5/2017 | Koenders | G06F 3/0488 |
| 2017/0239537 A1* | 8/2017 | Beck | A63B 53/06 |

FOREIGN PATENT DOCUMENTS

JP 2010-67104 A 3/2010

OTHER PUBLICATIONS

English langauge translation of abstract of JP20100067104 (A).

* cited by examiner

*Primary Examiner* — Creighton Smith
(74) *Attorney, Agent, or Firm* — Husch Blackwell LLP

(57) ABSTRACT

Systems and methods for customizing a personalized user interface of an IP video door phone using face recognition are provided. Methods can include receiving an image of a user captured by a camera, performing face recognition processing on the image to identify an age of the user, identifying a customized user interface associated with the age of the user, and causing a display screen to display the customized user interface.

11 Claims, 4 Drawing Sheets

SYSTEMS AND METHODS FOR CUSTOMIZING A PERSONALIZED USER INTERFACE USING FACE RECOGNITION

FIELD

The present invention relates generally to IP video door phones. More particularly, the present invention relates to systems and methods for customizing a personalized user interface of an IP video door phone using face recognition.

BACKGROUND

IP video door phones are known in the art and can include a user interface. However, depending on an age and capabilities of a user, configuration of the user interface can be inconvenient to use. Indeed, users of different ages may have different interface requirements.

In view of the above, there is a continuing, ongoing need for improved systems and methods.

DETAILED DESCRIPTION

Figure 1:
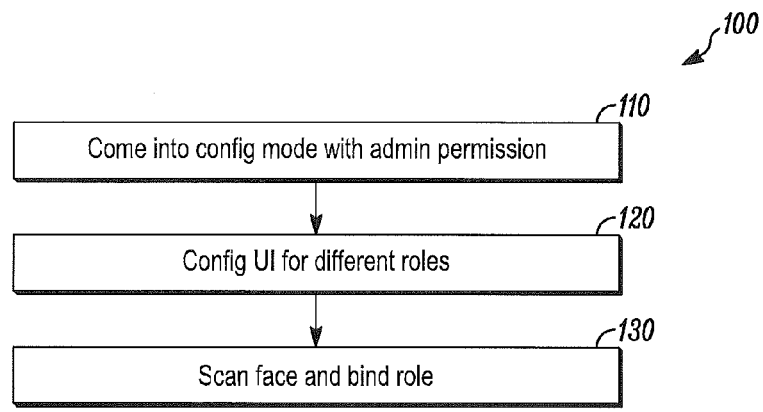
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for customizing a personalized user interface of an IP video door phone using face recognition. Advantages of the disclosed systems and methods include, but are not limited to providing an improved human user experience and preventing users of different ages from using the IP video door phone incorrectly.

In some embodiments, an IP video door phone device can include a camera, such as a CMOS camera, for video talk between different devices. The camera can capture an image of a user proximate the device, the device can perform face recognition processing on the captured image, and a user interface of the device can be customized based on results of the face recognition processing. For example, in some embodiments, the device can identify an age group of the user in the captured image and can cause a display screen of the device to display a user interface associated with the identified age group.

In some embodiments, a plurality of age groups can include an old age group, a child age group, and a middle age group. Users over a predetermined age can be associated with the old age group and be more likely to be presbyopic. Therefore, the customized user interface associated with the old age group can include fonts or icons that are amplified and/or increased in size. Similarly, users under a predetermined age can be associated with the child age group and be more likely to disturb configuration settings set by their parents. Therefore, the customized user interface associated with the child age group can include limited functionality.

FIG. 1 is a flow diagram of a method 100 in accordance with disclosed embodiments. As seen in FIG. 1, the method 100 can include placing an IP video door phone device in a configuration mode as in 110. Then, the method 100 can include identifying respective parameters for each of a plurality of different user interfaces as in 120, wherein each of the plurality of different user interfaces can be associated with a respective one a plurality of age groups. It is to be understood that each of the plurality of age groups can be associated with a respective one of a plurality of roles. It is also to be understood that that the parameters associated with the plurality of different user interfaces can be stored in a local or remote memory device or database. Finally, the method 100 can include scanning a face of a user and binding or associating an image of the scanned face with one of the plurality of roles, one of the plurality of age groups, and/or one of the plurality of different user interfaces as in 130. It is to be understood that associations between the image of the scanned face and the pluralities of user interfaces, age groups, and roles can also be stored in the local or remote memory device or database.

Figure 2:
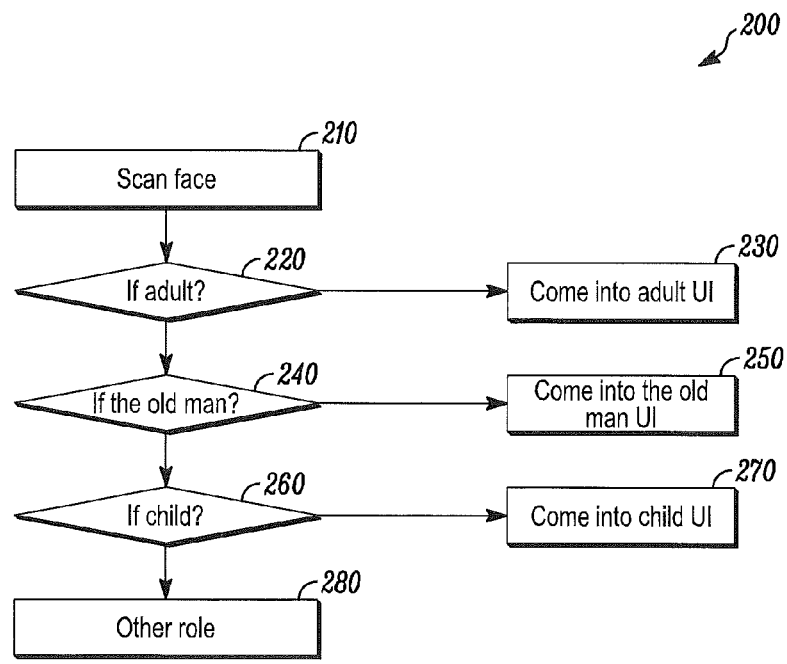
FIG. 2 is a flow diagram of a method in accordance with disclosed embodiments.

FIG. 2 is a flow diagram of a method 200 in accordance with disclosed embodiments. As seen in FIG. 2, the method 200 can include scanning a face of a user as in 210 and determining whether an image of the scanned face is indicative of the user being an adult as in 220, that is, having an age within a predetermined adult age range. If so, then the method 200 can include causing a display screen of a device to display a user interface associated with the predetermined adult age range as in 230.

Figure 3:
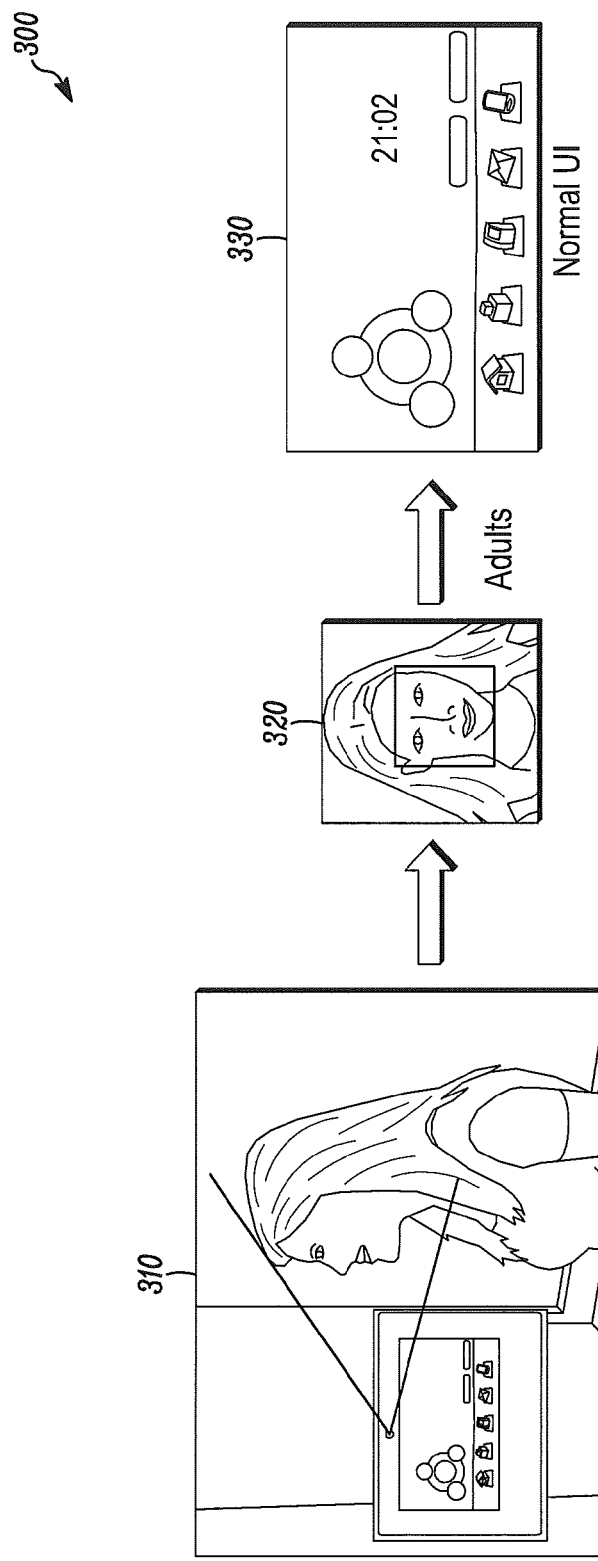
FIG. 3 is a block diagram of a method in accordance with disclosed embodiments.

For example, as seen in the block diagram of the method 300 in FIG. 3, the method 300 can include scanning the face of the user as in 310, performing face recognition processing on the image of the scanned face to determine that the user is an adult as in 320, and displaying a normal user interface associated with the predetermined adult age range as in 330. In some embodiments, the user interface associated with the predetermined adult age range can include a capability to control a full functionality of the device.

However, when the method 200 determines that the image of the scanned face is not indicative of the user being an adult as in 220, the method 200 can include determining whether the image of the scanned face is indicative of the user being an old person as in 240, that is, having an age within a predetermined old person age range or having an age above a predetermined age. If so, then the method 200 can include causing the display screen of the device to display a user interface associated with the predetermined old person age range as in 250.

Figure 4:
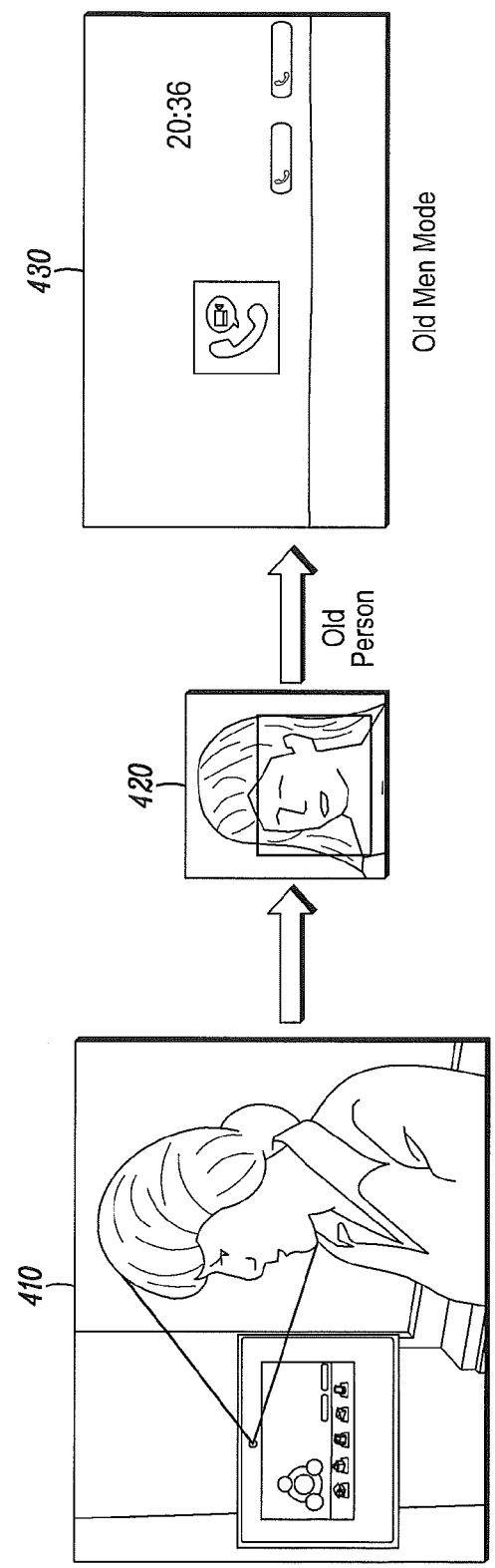
FIG. 4 is a block diagram of a method in accordance with disclosed embodiments.

For example, as seen in the block diagram of the method 400 in FIG. 4, the method 400 can include scanning the face of the user as in 410, performing the face recognition processing on the image of the scanned face to determine that the user is an old person as in 420, and displaying an old person user interface associated with the predetermined old person age range as in 430. In some embodiments, the user interface associated with the predetermined old person age range can include fonts or icons with an increased size relative to a size of the fonts or icons on the normal user interface.

However, when the method 200 determines that the image of the scanned face is not indicative of the user being an old person as in 240, the method 200 can include determining whether the image of the scanned face is indicative of the user being a child as in 260, that is, having an age within a predetermined child age range or having an age below a predetermined age. If so, then the method 200 can include causing the display screen of the device to display a user interface associated with the predetermined child age range as in 270. If not, then the method 200 can include determining that the image of the scanned face is indicative of the user having another role as in 280.

Figure 5:
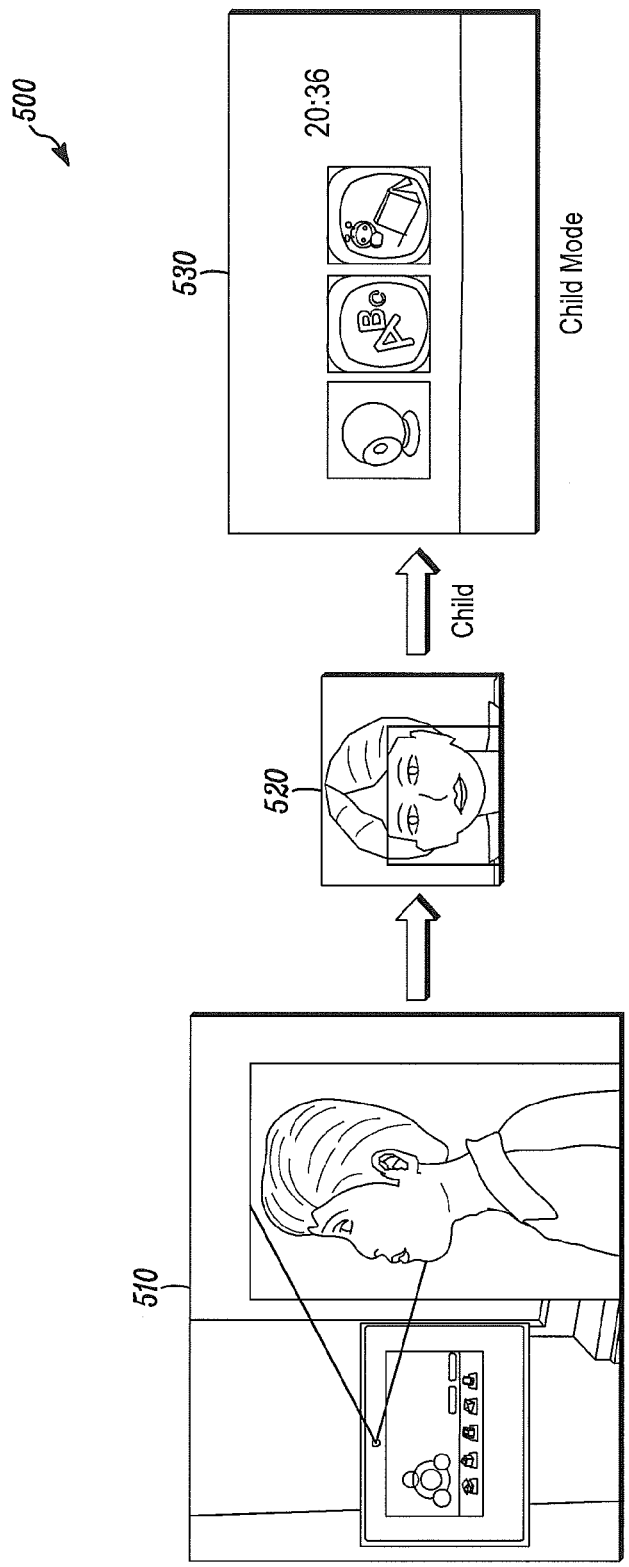
FIG. 5 is a block diagram of a method in accordance with disclosed embodiments.

For example, as seen in the block diagram of the method 500 in FIG. 5, the method 500 can include scanning the face of the user as in 510, performing the face recognition processing on the image of the scanned face to determine that the user is a child as in 520, and displaying a child user interface associated with the predetermined child age range as in 530. In some embodiments, the user interface associated with the predetermined child age range can include the capability to control limited functionalities of the device.

It is to be understood that the IP video door phone device as disclosed and described above can include the camera described above, a transceiver device, and a memory device, each of which can be in communication with control circuitry, one or more programmable processors, and executable control software as would be understood by one of ordinary skill in the art. The executable control software can be stored on a transitory or non-transitory computer readable medium, including, but not limited to local computer memory, RAM, optical storage media, magnetic storage media, flash memory, and the like. In some embodiments, some or all of the control circuitry, the programmable processors, and the executable control software can execute and control at least some of the methods described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   receiving an image of a user captured by a camera;
   performing face recognition processing on the image to determine whether the user is an adult;
   when the face recognition processing indicates that the user is the adult, identifying an adult user interface and causing a display screen to display the adult user interface;
   when the face recognition processing fails to indicate that the user is the adult, performing the face recognition processing on the image to determine whether the user is an old person;
   when the face recognition processing indicates that the user is the old person, identifying an old person user interface and causing the display screen to display the old person user interface;
   when the face recognition processing fails to indicate that the user is the adult or the old person, performing the face recognition processing on the image to determine whether the user is a child; and
   when the face recognition processing indicates that the user is the child, identifying a child user interface and causing the display screen to display the child user interface.

2. The method of claim 1 wherein the adult user interface includes controls for controlling a full functionality of an associated device.

3. The method of claim 1 wherein the old person user interface includes amplified fonts or icons.

4. The method of claim 1 wherein the child user interface includes controls for controlling a limited functionality of an associated device.

5. The method of claim 1 further comprising identifying the adult user interface, the old person user interface, or the child user interface from a database stored in a memory device.

6. A system comprising:
   a camera;
   a display screen;
   a programmable processor; and
   executable control software stored on a non-transitory computer readable medium,
   wherein the camera scans a face of a user proximate the camera,
   wherein the programmable processor and the executable control software perform face recognition processing on an image of the face to determine whether the user is an adult,
   wherein, when the face recognition processing indicates that the user is the adult, the programmable processor and the executable control software identify and cause the display screen to display an adult user interface,
   wherein, when the face recognition processing fails to indicate that the user is the adult, the programmable processor and the executable control software perform the face recognition processing on the image to determine whether the user is an old person,
   wherein, when the face recognition processing indicates that the user is the old person, the programmable processor and the executable control software identify and cause the display screen to display an old person user interface,
   wherein, when the face recognition processing fails to indicate that the user is the adult or the old person, the programmable processor and the executable control software perform the face recognition processing on the image to determine whether the user is a child, and
   wherein, when the face recognition processing indicates that the user is the child, the programmable processor and the executable control software identify and cause the display screen to display a child user interface.

7. The system as in claim 6 wherein the old person user interface includes amplified fonts or icons.

8. The system as in claim 6 wherein the adult user interface includes controls for controlling a full functionality of the system.

9. The system as in claim 6 wherein the child user interface includes controls for controlling a limited functionality of the system.

10. The system of claim 6 wherein the programmable processor and the executable control software identify the adult user interface, the old person user interface, and the child user interface from a database stored in a memory device.

11. The system of claim 10 wherein the memory device is a remote memory device.

\* \* \* \* \*